United States Patent [19]
Mueller

[11] Patent Number: 6,115,544
[45] Date of Patent: Sep. 5, 2000

[54] METHOD AND SYSTEM FOR DISPLAYING ERROR MESSAGES

[75] Inventor: Steven Holt Mueller, San Jose, Calif.

[73] Assignee: International Business Machines Corporation, Armonk, N.Y.

[21] Appl. No.: 08/319,338

[22] Filed: Oct. 6, 1994

Related U.S. Application Data

[63] Continuation of application No. 07/939,819, Sep. 3, 1992, abandoned.

[51] Int. Cl.$^7$ .................................................. G06F 11/00
[52] U.S. Cl. .................................. 395/185.1; 395/185.01; 364/267.91; 364/275.5
[58] Field of Search ................................ 395/575, 185.01, 395/185.05, 185.02, 185.07, 185.1; 371/29.1, 16.1, 16.4, 17, 18, 19, 15.1, 16.5; 364/927.2, 927.7, 927.63, 265, 267, 267.7, 267.91, 275.5

[56] References Cited

U.S. PATENT DOCUMENTS

| | | | |
|---|---|---|---|
| 3,599,156 | 8/1971 | Miller ................................... | 340/172.5 |
| 4,420,819 | 12/1983 | Price et al. ........................ | 364/464.03 |
| 4,635,260 | 1/1987 | Sestan ..................................... | 371/22 |
| 4,654,852 | 3/1987 | Bentley et al. ......................... | 371/294 |
| 4,831,525 | 5/1989 | Saito et al. .............................. | 395/700 |
| 4,845,665 | 7/1989 | Heath et al. ............................ | 364/900 |
| 4,858,102 | 8/1989 | Lovrerich ................................ | 364/136 |
| 4,888,690 | 12/1989 | Huber ...................................... | 395/600 |
| 4,956,773 | 9/1990 | Saito et al. .............................. | 395/159 |
| 5,036,318 | 7/1991 | Bachhuber et al. ............... | 340/825.16 |
| 5,040,142 | 8/1991 | Mori et al. .............................. | 364/900 |
| 5,058,185 | 10/1991 | Morris et al. ............................ | 382/41 |
| 5,128,776 | 7/1992 | Scorse et al. ............................ | 358/426 |
| 5,134,501 | 7/1992 | Satomi et al. ........................... | 358/400 |
| 5,157,783 | 10/1992 | Anderson et al. .................... | 364/927.7 |
| 5,233,611 | 8/1993 | Triantafyllos et al. ................ | 371/16.1 |
| 5,241,671 | 8/1993 | Reed et al. .............................. | 395/600 |
| 5,347,646 | 9/1994 | Hirosawa et al. ....................... | 395/575 |

FOREIGN PATENT DOCUMENTS

| | | | |
|---|---|---|---|
| 2186339 | of 0000 | Japan . | |
| 3188242 | of 0000 | Japan . | |
| 2244224 | 9/1990 | Japan ................................ | G06F 9/06 |

OTHER PUBLICATIONS

Downey, "VS/PASCAL Compiler Error Debug Aid", IBM Technical Disclosure Bulletin, vol. 31, No. 12, May 1989.

*Primary Examiner*—Robert W. Beausoliel, Jr.
*Assistant Examiner*—Dieu-Minh Le
*Attorney, Agent, or Firm*—Marilyn Smith Dawkins

[57] ABSTRACT

A method and system for interactively displaying error messages, such as parser or compiler messages, associated with a user's source code is described. The processors generating the messages may execute on a remote computer. Whether locally or remotely generated, the error messages are stored as error message data entries in an error list. Each entry designates an error type and specifies the location of the error in the source code. When the source code consists of multiple files the identifier of the specific file in which the error was found is also designated. When the error list is displayed for the user, the user may select one error message data entry in the error list and thereby cause the portion of the source code containing the error to be displayed for editing. When the user modifies or deletes the portion of the source code corresponding to a selected error message data entry, the Error List is updated to reflect the modification or deletion. The file in which the error occurred may be loaded automatically into the editor. If a remote computer is connected, the source code is transmitted to the remote computer for processing and the error data is then transmitted back.

36 Claims, 4 Drawing Sheets

METHOD AND SYSTEM FOR DISPLAYING ERROR MESSAGES

This application is a continuation of application Ser. No. 07/939,819, filed on Sep. 3, 1992, now abandoned, entitled "METHOD AND SYSTEM FOR DISPLAYING ERROR MESSAGES", in the name of Steven H. Mueller.

TECHNICAL FIELD

The present invention relates to methods and systems in the field of interactive computer program development and more particularly to gathering, displaying and processing error data from a plurality of language processors.

BACKGROUND OF THE INVENTION

Computer programmers conventionally work by entering and modifying source code in files in the computer through the use of an editor. The plurality of files of source code are processed to create an executable program by having the computer translate the source code into an executable form by running a series of programs which might typically include combinations of a macro processor, various preprocessors, a compiler and linker. Each of these processors may generate error messages or error data which aid the programer in identifying the nature of the errors and the lines of code causing the errors so that the errors can be corrected. It is possible to link an editor, compiler, linker and a debugger into an integrated development system to allow the source code to be modified and processed without having to leave the development environment.

Compilers typically provide the programer with a "compiler listing" which lists the source code along with the errors. On mainframe computers, the list of errors was either at the end of the source listing, or interspersed through the source listing. On personal computers (PCs), many commercially available compilers, (such as the well known Borland Turbo C), display the errors in the same window in which the source file is being edited.

J. H. Downey has described a method which imbeds error messages into a "VS/PASCAL" source program. When a "VS/PASCAL" program is compiled, a listing file is generated containing possible errors. The "VS/PASCAL Program Debug Aid" parses the listing file and creates a new source file. The contents of the new source file includes comments placed next to the applicable error. To correct compile errors, the programmer need only edit the source file. When all errors have been corrected, the system allows for the automatic deletion of the imbedded error messages. (IBM Technical Disclosure Bulletin, 05-89, P.376).

Automatically having an editor display the line containing an error in a file for a source program having an error when an error is detected during translation of the source program has been described by M. Amano (published Japanese patent app. JP 02-244224, 09-28-90).

Special problems not solved by the prior art arise when the errors may come from multiple sources such as a local parser or compiler, as well as a remote compiler which runs on a second computer such as a mainframe host computer or minicomputer connected through a communication link. Additional problems arise when the errors occur in one or more of the plurality of files comprising the source code for a program.

SUMMARY OF THE INVENTION

The invention is a method and system for displaying error messages associated with a user's source code. The error messages may be generated by parsers, compilers or any program which processes source code or text. These processors may be local, i.e., execute on the same personal computer where the user edits the source code, or they may execute on a remote computer connected by standard communication means. The error messages are stored as error message data entries in an error list in the memory of the computer. Each entry designates an error type and specifies the location of the error in the source code. When the source code consists of multiple files the identifier of the specific file in which the error was found is also designated. All or part of the Error List is displayed for the user, preferably in a window. The user may select one error message data entry in the Error List and thereby cause the portion of the source code containing the error to be displayed for editing. When the user modifies or deletes the portion of the source code corresponding to a selected error message data entry, the Error List is updated to reflect the modification or deletion. The Error List may dynamically grow and shrink as the user corrects the source code and submits all or a unit of the code for local or remote processing. As the process is repeated responsive to keyboard input by the user, new errors will be stored in the Error List, the list will be redisplayed and errors will be deleted from the list until keyboard input indicative of a command to halt is received. When there are multiple files of source code and the user selects an error in the Error List, the file in which the error occurred may be loaded automatically into the editor. If a remote computer is connected, all or part of the source code is transmitted to the remote computer for processing when the user so requests. The error data is then received back from the remote computer and placed in the Error List. The error data may be transmitted to the Error List processor as message data when the system supports program to program messages, but it may also be communicated in file form.

DETAILED DESCRIPTION OF THE INVENTION

Figure 1:
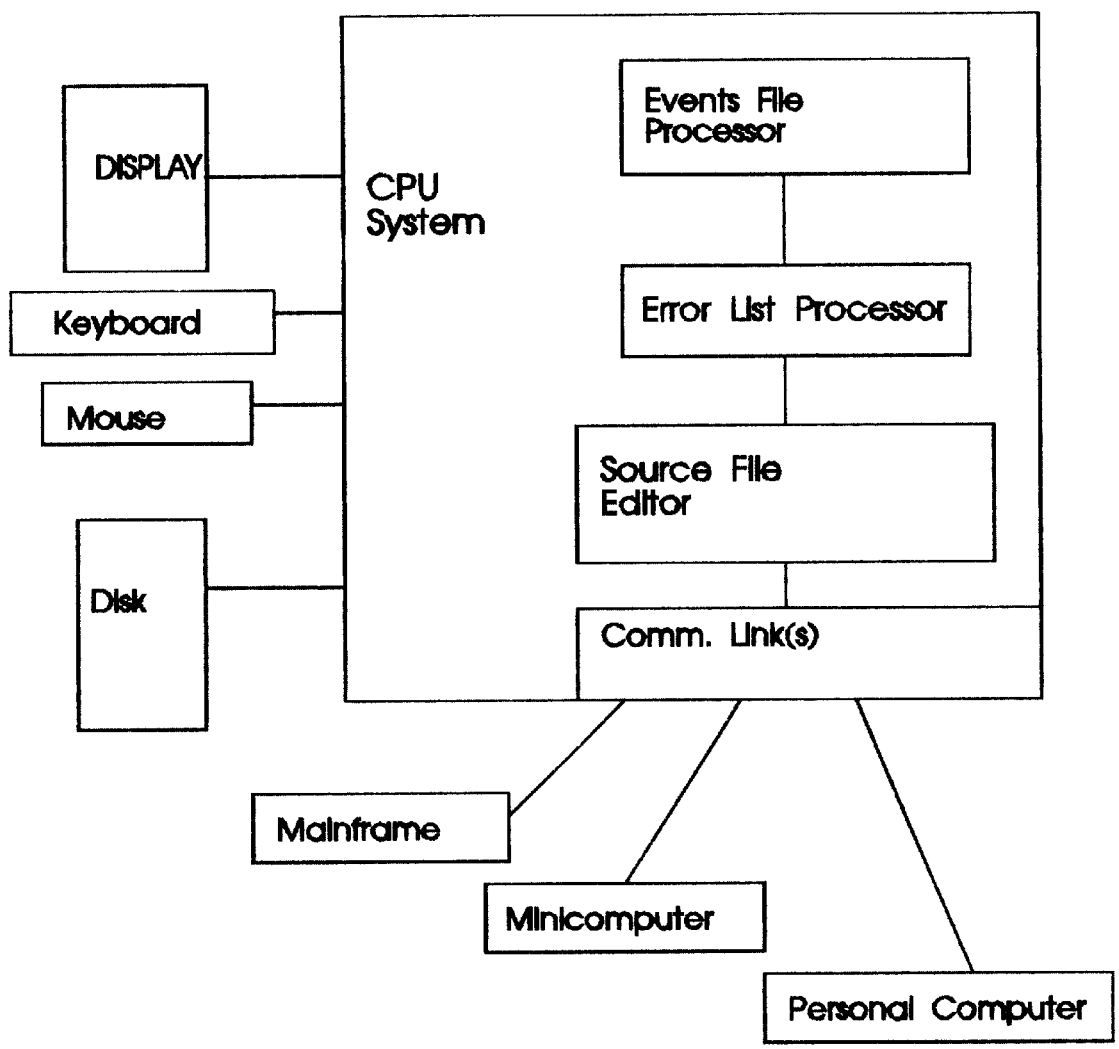
FIG. 1 is a block diagram of an embodiment of the invention.

Reference is made to FIG. 1. The detailed embodiment of the invention is implemented in a conventional personal computer or workstation having a CPU System which includes a microprocessor, memory and one or more communication links to any combination of mainframes, minicomputers and personal computers. The invention is intended to function interactively; therefore, means for presenting data to a user and for receiving input from a user are required. The standard display, keyboard, mouse and hard disk(s) are preferably present. The control of the display contents and the traditional editing functions are controlled by a source file editor (Editor) which has been modified to interact with an Error List Processor. The inputs to the Error List Processor are Error List Messages. An Events File Processor converts data in Events Files into a message stream for the Error List Processor. The Editor, the Error List Processor and the Events File Processor reside on the personal computer or workstation.

Figure 2:
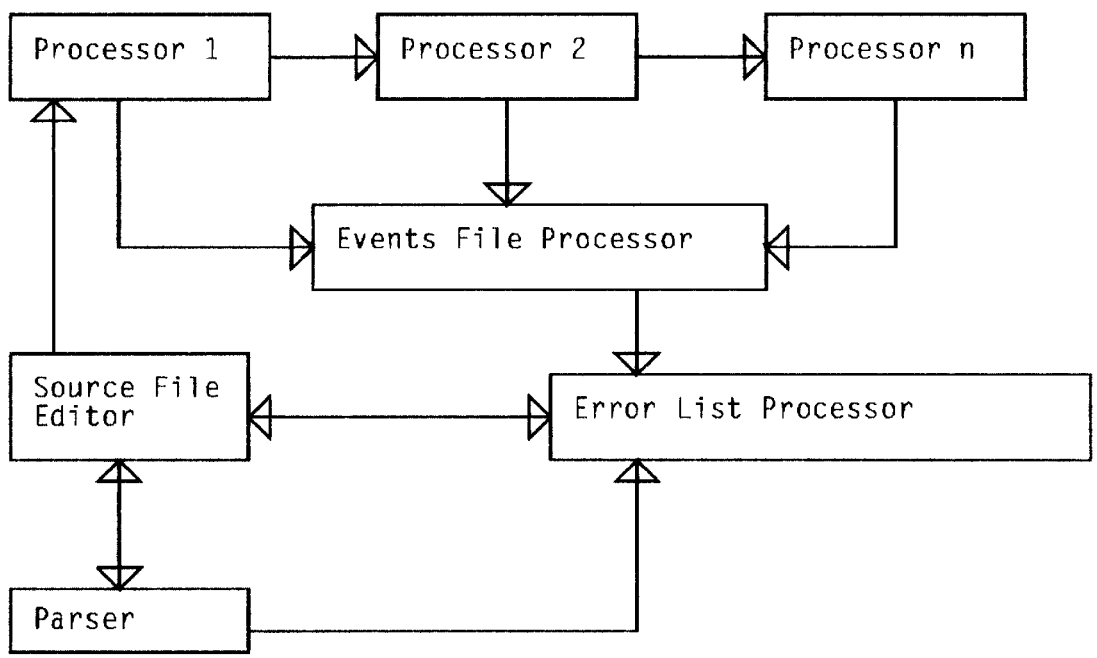
FIG. 2 is an overview of the information flow in an embodiment of the invention.

FIG. 2 will be used to illustrate the flow of information. Multiple language processors such as compilers can be executed by the Source File Editor, hereinafter called the Editor. These language processors may be local, i.e., execute on the personal computer with the Editor, or they may be remote, i.e., execute on a mainframe, minicomputer or another personal computer. The language processors create an Events File which contains the information identifying the file in which the error occurs, the error types and the locations of the error in the file when possible. If the Events File is remote, it is transmitted on the communication link back to the user's computer. If the Events File is local, it can be stored on disk or in the system's RAM. The Events File is processed by the Events File Processor which generates a set of program-to-program messages which are sent to the Error List Processor which builds the Error List. An alternative mechanism is provided for local language processors to send messages directly to the Error List Processor, thereby by-passing the Events File. In the detailed embodiment a local Parser is used by the Editor to parse source lines entered by the user as they are entered or as a batch process. In the detailed embodiment the Parser communicates with the Editor which interfaces with the Error List Processor. Alternatively the Parser could be designed to send messages to the Error List Processor. Both of these paths are shown in FIG. 2.

When an error is detected, either through a local process such as a syntax checker (parser) or a remote process (like a host compiler), this information is sent to the Error List. For each file containing an error, that file's name will be displayed in the Error List Window, followed by an indented list of all errors that were detected in that file (see FIG. 3). In the method of the invention a user (computer programmer) may select an error in the Error List and the file containing that error will be displayed on the workstation with the text that caused the error highlighted in the file. In the preferred embodiment the selection is made by placing a mouse cursor on the error field and pressing a button on the mouse ('clicking'). If the user modifies a line containing the text of the error, the Error List will be updated by either removing the error from the Error List or by checkmarking the error in the Error List (dependent on whether the error was detected by a local or host process). If the user modifies the source code file and creates a new error, if the error is detectable by a local process, it will be added to the Error List and highlighted immediately in the source code.

The method of the invention has the following features:

- The user can see all errors in one location (the Error List), while still being able to easily locate the file and text containing the error.
- The Error List has an Application Programming Interface (API) that allows information in the window to be modified. This allows programs like tokenizers and syntax checkers to add or delete errors from the Error List without having to generate an external file.
- The Error List is language independent, so errors from multiple languages may be displayed in the window.
- This mechanism is not restricted to compilers and programming languages. For example, it would be straightforward to get a batch text printing control product like IBM's BookMaster program to generate the information required to have its error displayed in the IDE Error List.

The invention's method has the following advantages:

- The source code is not modified and all errors are listed. Other systems either embed the error messages in the source code, which makes it difficult to see where all the errors are located (like Borland's Turbo C), or stop compiling when the first error is detected to allow it to be fixed (like Borland's Turbo Pascal). Some systems produce a summary of all errors in a file, but the user has to look in multiple places to find all the errors for the project. After doing a MAKE, for example, you would have to look in multiple listing files or multiple windows.
- The Error List API allows updating the Error List quickly when the source file is changed.
- The system is not tied to the compiler or language processor being used because it has a general interface.

Displaying Errors

Two types of errors can be displayed in the detailed embodiment of the invention—parsing errors detected by the live parser (which is local), and errors detected by the compiler (which may be remote) after a compilation is done. Generally, when an error is detected, the token causing the error will be highlighted in all views of the file, and the actual error message will be shown in a window called the Error List. An exception is those errors not generally associated with a location in a file, such as out-of-storage conditions or invalid compile-time options. See "User Interactions" for details on how tokens are highlighted and error messages are displayed.

Invocation

To get error information from the live parser, the parser must be active. Select Language editing options . . . from the Options pull-down and activate the live parser using the options in the Parsing events group box, or use one of the syntax checking actions in the Go pull-down. To get compile-time errors, the file must be compiled with the compiler's compile-time option that causes an Events File to be created.

User Interactions

Several facilities exist to indicate where errors occurred in the file and to locate them. Errors in the file are displayed in a different font and color than normal text, and a special window will display the files that contain errors along with the errors for each file. Also, a method exists to search for errors in a file.

Highlighting Errors in the Source

Each token or line associated with an error message in the file may be shown in a specific font and/or in a specific color, e.g., red for errors, yellow for warnings, and green for informational messages. Both parser and compiler errors may use these fonts and colors by default. However, the user should be able to change the fonts and colors for parser and compiler errors independently of each other if he wants to know if a specific error came from the parser or a compiler. If more than one class of message occurs for a token or line, the color used to display it will be that of the most severe message. For example, if a token caused both a warning and an error, it would be displayed in red, not yellow. If the messages have the same severity, the font and color of the compiler messages will be chosen over those of the parser messages.

Whenever the user changes a line containing errors, if a parse is done on the line, any previous error highlighting on that line (and possibly others) will be lost. Any corresponding parser messages will also be removed from the Error List window, but any compiler messages in the Error List window corresponding to that line or token will have a check mark placed next to them (instead of being removed from the window). This is done because changing and re-parsing a line does not guarantee that compiler errors are fixed, and the user may need to find text containing compiler error messages even though the token or line causing the error will not be highlighted as an error. Keeping these messages in the Error List also allows the user to see which errors have possibly been fixed by changes made to the text. For example, one change could fix several errors or the user could have made multiple changes to the line. Performing another compile on the file will remove compiler messages from the Error List (assuming the errors that caused the messages were fixed). If parsing is not enabled, parser messages corresponding to a changed line will have a check mark placed next to them, too.

If the entire text range corresponding to a compiler message is deleted, the message in the Error List window will be grayed out and a check mark will be placed next to it. This will indicate that the error may no longer exist in the file. Because the message is no longer associated with text in the file, however, "Find error" and "Next error" will not work for the message. If the entire text range corresponding to a parser message is deleted, the message in the Error List window will be deleted.

If new parser errors are discovered during a parse, they will be highlighted and added to the Error List.

Errors Not Contained in a Source File

The previous section dealt with errors that were located in a source file, but not all errors are the result of problems in source files. Invalid compiler options, compilers running out of memory or disk space, and so on, are examples of these types of errors.

Errors of this type will be divided into two classes: fatal and non-fatal. Fatal errors, such as a compiler running out of memory, will be displayed in gray at the top of the appropriate file grouping with an octagonal icon (suggesting a stop sign) next to them. Non-fatal errors, such as invalid compiler options being specified, will be displayed in gray at the bottom of the appropriate file grouping with a downward-pointing triangle icon (suggesting a yield sign) next to them. The messages are displayed in gray to indicate that they do not correspond to any text in a source file.

The Error List Window

Figure 3:
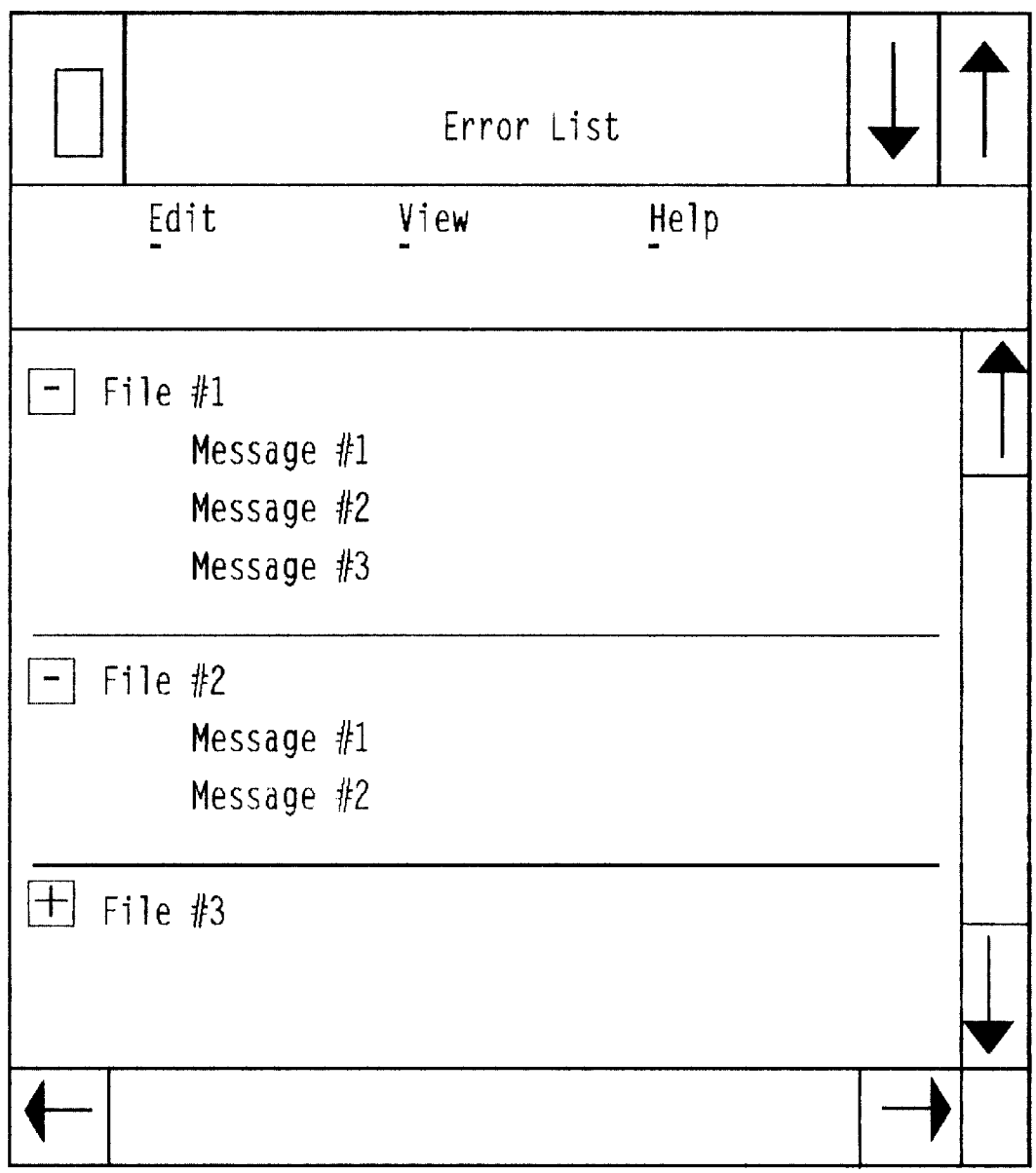
FIG. 3 is an example of an Error List window.

All error message information is shown in a read-only window (called the Error List). An example is shown in FIG. 3. It is a standard window which displays a list of files (Files #1, #2 and #3) containing errors and the error messages in those files. It shows the user all error messages for each file and provides the user with an easy way of displaying each file in the editor.

Methods of displaying the Error List and the various pull-downs in the Error List are described below.

Displaying the Error List: The Error List window will pop up if any errors were detected after a parse or during a compilation. This window should not have keyboard focus, however, to allow the user to continue to typing in the window he is currently using. If no errors occurred during any parsing or compiling, or all messages have been deleted by fixing them, then there are no error messages in the Error List, and the "Display error list" action in the Go pull-down is grayed out. If errors occur during compilation of a file, but the user exited the integrated development environment (IDE) during the compile (for example, during a batch compile), the next time the file is opened, errors will be highlighted in the source and the Error List window will appear.

If errors were detected in the file, but the version of the file compiled does not match the version of the file available to the IDE a message will be displayed in a message box to indicate that errors might not be displayed properly. The user can choose whether or not to display the errors in this case.

The Error List window can also be displayed by selecting the Display error list action from the Go pull-down. The Error List will be placed on top of all other windows, and a line will be selected in the window according to the following rules:

1. If "Display error list" was issued from a window containing no errors, the top line in the Error List window will be selected.
2. If "Display error list" was issued from a window containing no findable errors, from a window whose file is contracted or from a window whose file has all findable errors hidden, the file name line will be selected.
3. If the cursor is at the start of text corresponding to an error message, and the last "Next error" issued placed the cursor at this point, the message selected will be the one corresponding to the text selected by the "Next error".
4. If the cursor is at the start of text corresponding to an error message, and the last "Next error" issued did not place the cursor at this point, or if the cursor is not at the start of text corresponding to an error, the line selected will be that which would have been selected if a "Next error" was issued immediately preceding the "Display error list".

Edit Pull-down: The Edit pull-down menu allows the user to place information in the Error List in the clipboard and to locate the text that caused a given error. The "Copy" and "Find error" actions are selectable in the Edit pull-down. "Copy" is the standard clipboard action. "Find error" will find and select the line or token corresponding to the message selected in the Error List window. If the file containing the corresponding error is not in an edit window, it will be loaded into one. Double-clicking on the selected message also finds the error. If the message is not associated with any text in the file (in other words, grayed out), "Find error" will be grayed out, and double-clicking on the message will have no effect.

If multiple views of a given file are open, the view that last had focus will be the one used to locate the error. If the text corresponding to the error being searched for is not contained in the view, the cursor will be placed before the hidden section containing the text corresponding to the message and a system message will be issued. The user can either select a view where the text is visible or change the view so that the error is visible, and issue the "Find error" again. Pressing the OK button in response to the system message will cause the latter action to be done for the user.

View Pull-down: The View pull-down menu allows the user to view all error information or only a subset of it. The following described actions are available in the View pull-down.

Selecting "Contract file" will "contract" the selected file name and the error messages beneath it so that only the file name is displayed. If a "−" icon is shown next to the file name, the file can be contracted. Contracting can be done either by selecting the "Contract file" action, clicking on the "−" icon, or typing the "-" key (the accelerator for "Contract file").

Selecting "Expand file" will "expand" the selected file name so that the file name is displayed with associated error messages displayed beneath the file name. If a "+" icon is shown next to the file name, the file can be expanded. Expanding can be done either by selecting the "Expand file" action, clicking on the "+" icon, or typing the "+" key (the accelerator for Expand file).

"Contract all files" contracts all the files in the Error List window. "Expand all files" expands all the files in the Error List window. By default, all files are expanded when the Error List is first displayed. When an error message is added to the Error List window for a contracted file, the file is automatically expanded so that the new message is visible.

"Hide error" hides the selected error message. If a file name is selected, this action is grayed out. This action allows the user to temporarily remove error messages from the Error List that he believes he has fixed or that he believes have the same cause as another message in the Error List.

"Restore errors" restores all hidden error messages. This is especially useful if the user has accidentally hidden an error message. "Hide error" and "Restore errors" are independent of file contraction and expansion. If a message is hidden, the file containing the message is contracted, and when "Restore errors" is selected, the message will not be visible until the file is expanded again.

"Show error numbers" toggles the display of the assigned message numbers and severity codes to the left of the corresponding error messages. Message numbers are generally only useful for looking items up in a book or reporting problems to service, and so are not shown by default. A check is displayed next to this action when selected.

Searching for Errors

In addition to the Error List window, which allows a user to find a specific error in the file, a method is provided to find the next error after a given point in the file. In the search menu, the "Next error" action will select the next token or line containing an error in the file starting from the current cursor position. If no errors exist in the current file, "Next error" is grayed out. If multiple error messages exist for a token or line, the cursor will not move, but text corresponding to a different message (which could be the same text previously found) will be selected.

If the text corresponding to the next error is not contained in the current view, the cursor will be placed before the hidden section containing the text corresponding to the next error and a system message will be issued. The user can change the view so that the error is visible, and issue the "Next error" again. Pressing the OK button in response to the system message will cause this to be done for the user. If the bottom of the file is reached, the search will wrap and a system message will be displayed to indicate this wrapping. "Next error" will only find errors that are associated with text in the file. Thus, tokens or lines containing compiler errors which are not highlighted any more due to re-parsing will still be found, but errors not associated with a particular line or token in the file (for example, out-of-storage or invalid compiler option errors) will not be found.

This section describes the design of all interactions with the Error List window and error marking in the Edit Window. The main components of error feedback include:

Building the Error List from Messages and Events Files

Modifying data in the Error List

Handling user interactions with the Error List

Indicating and locating errors in the source file

Displaying the Error List

Locating the next error in a file

Displaying message help

The Error List is a data structure which is usually stored in RAM. There are two main ways to add or delete errors to the Error List—the Events File and a message interface to the Error List. The Events File is for use by compilers that cannot send messages directly to the Error List or that need special processing to locate errors in the original source file. The messages are for syntax checkers and compilers that can send messages to the Error List and know the exact locations of errors in the original source file. The system support for sending messages is outside of the invention and must be supplied by an operating system such as IBM's OS/2 or AIX. When an Events File is processed, messages contained in the Events File will be added to the Error List using the message interface. Therefore, a processor or program should use the message interface if at all possible, as it will avoid the overhead of processing an Events File.

The Error List window will be created at initialization, and the window handle will be stored in the Global Control Block (GCB), the main control block used by the IDE editor. A pointer in a structure pointed to by the Error List's window words will point to the start of the Error List data structure. If the Error List is empty, the "Display error list" action will be grayed-out, and the Error List window will not be in the window list. If the Error List is ever displayed, the Error List window will be added to the Window List. When the Error List is closed, it will be removed from the Window List.

Figure 4:
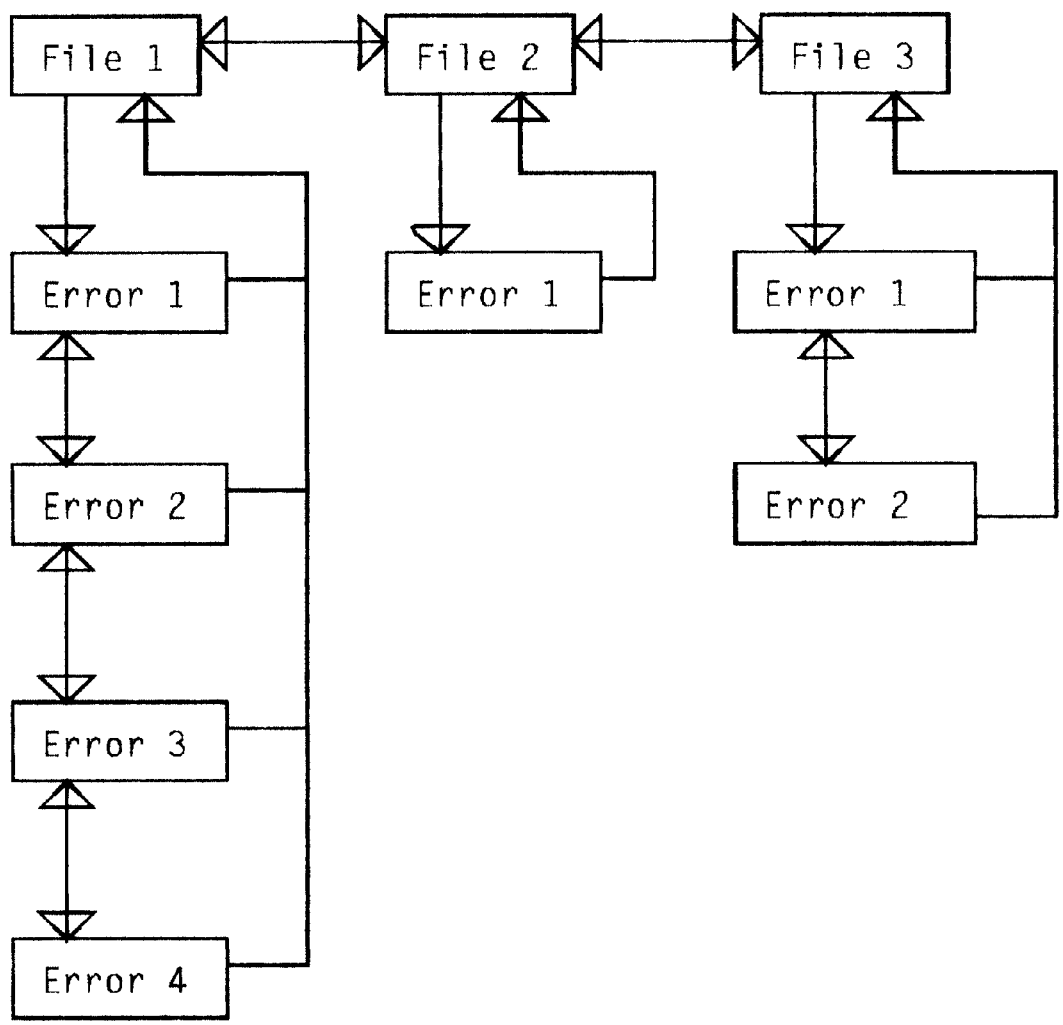
FIG. 4 illustrates the data structure containing the information used in the invention for the Error List window.

The basic structure of the information needed by the IDE for displaying the Error List window is illustrated in the data structure shown in FIG. 4. File 1 has a pointer to File 2 and File 2 has a pointer back to File 1 and so forth. File information is kept in a doubly-linked list. For each file, a pointer points to the first error in the file (used when writing out the Error List window). File information is kept in a File Information Record (FIR). Each error in the file is kept in a doubly-linked list with a pointer back to the corresponding file. This pointer is used when "Find error" is selected to determine which file the message is located in. Error information is kept in an Error Information Record (EIR).

The information in this data structure is used to fill the Error List window. The Error List window itself is implemented as a list box. Each line in the list box corresponds to a filename or a message. Associated with each line is an item handle, which for a file is a pointer to the corresponding FIR, and for a message is a pointer to the corresponding EIR. This allows easy checking whether the selected line is a file or error message, and allows us to get the details of the item.

All requests to update the Error List will be initiated by sending messages to the Error List's window procedure. There are five actions that can cause the Error List to change:

Invoking the live parser or syntax checking all or part of the file

Compiling a file (using either a compiler or program verifier)

Issuing a Get events file . . . to retrieve an Events File (usually after a batch compile) Deleting a text range that contains an error Changing a text range that contains an error Actions which add a message to the Error List cause it to pop up. Other actions keep the Error List as it was, although changes will be visible if the Error List is visible and not minimized.

In the following sections, message names are arbitrary:

Updating the Error List after parsing: To make an update to the Error List, an EVF_BEGINERRLISTUPDATE message is first sent to the Error List. An EVF_DELMSGCLASSFROMERRLIST message is then sent with a File Location Information Record (FLIR) containing a pointer to the Edit Control Block (ECB) of the file and specifying the insertion point (IPT) range being parsed to delete messages corresponding to text in that range, followed by one EVF_ADDMSGTOERRLIST for each new error detected. Finally, an EVF_ENDERRLISTUPDATE is sent to complete the update process.

Updating the Error List after compiling: After compiling a file interactively or verifying a program, a call to the routine which processes Events Files should be made. This routine will process the Events File (if any), and then send messages to update and display the Error List if the Events File contains any error records. The messages sent are similar to those specified in "Updating the Error List after parsing" except that the EVF_DELMSGCLASSFROMERRLIST should specify that Compiler errors are being deleted, and should place the Server name and File name instead of the pointer to the ECB in the FLIR. Also, the IPT range specified should be (0,0).

Updating the Error List after a Get events file action: The processing is similar to the actions that occur after compiling a program interactively.

Updating the Error List after deleting text corresponding to an error: When a text range containing an error is deleted, the internal editor label marking the error will be destroyed and a routine will be called to gray out and check a compiler message or delete a parsing error in the Error List.

Updating the Error List after changing text corresponding to an error: When a text range containing an error is changed, a routine will be called to place a check mark next to the message in the Error List.

Indicating and Locating Errors in the Source File

Each error in the source file will be marked using a label. The label will have a pointer to the corresponding EIR. This allows highlighting the appropriate message in the Error List when the user selects "Display error list".

Displaying the Error List

When the user selects the "Display error list" action, a routine bound to that action will be called which will determine which line in the Error List to select, then send a message to the Error List to display itself, highlighting that message.

Locating the Next Error in a File

When the user selects the "Next error" action, a routine bound to that action will be called which will locate the next error shown in the Error List, retrieve the IPT range of the error from the label corresponding to that message, and send a message to the Edit Window to select the text in that IPT range.

Displaying Message Help

When the user hits a selected function key, e.g. F1, while a message is selected, help for that message is displayed. To do this, the message ID of the selected message is used to perform a lookup in a table that associates message IDs with help IDs. This table is supplied in the Language Profile for a given language.

The lookup will first be tried using the profile associated with the Edit Window if the file containing the message is in an Edit Window. If the IPF ID is not found, a lookup will be tried in all profiles pointed to by the GCB. This second lookup is required in case the file is open, but not using the profile for the language the message is associated with (for example, the file is C code, but was opened with a default profile). This requires each processor to have unique message IDs. For example, RPG 400 could issue messages from the syntax checker, the Program Verifier, or the compiler. Each of these must produce different message IDs, even if the message says basically the same thing. After the lookup, if the IPF ID is found, the message is displayed.

External File Information Record (XFIR)

The XFIR is used when sending messages to the Error List. It points to either the server and file names of the file (for example, when processing an Events File), or to the ECB of the file (for example, when tokenizing a file).

```
XFIR
typedef struct _xfir {
    PSZ           pszServer;      //Pointer to name of server
    PSZ           pszFileName;    //Pointer to name of file
    PECB          pECB;           //Pointer to ECB of file
} XFIR;
typedef struct _xfir   *PXFIR;    //Pointer to XFIR
```

External Error Information Record (XEIR)

The XEIR is used when sending messages to the Error List. It provides information on the type and location of the message. If the IPT range of the error is known, it should be saved in iptRange and fRangeValid should be set to TRUE. Otherwise, ulStartLine, ulStartCol, ulEndLine, and ulEndCol should be set, and fRangeValid should be set to FALSE.

```
XEIR
typedef enum { All, Parser, Scanner, Compiler } ERRCLASS;
typedef enum { Top, Middle, Bottom } ANNOTCLASS;
typedef struct _xeir {
    ERRCLASS      ErrClass;       //Type of Error
    ANNOTCLASS    AnnotClass;     //Location of error in list
    ULONG         ulStartLine;    //Starting line of error
    ULONG         ulStartCol;     //Starting column of error
    ULONG         ulEndLine;      //Ending line of error
    ULONG         ulEndCol;       //Ending column of error
    EPIPTRANGE    iptRange;       //IPT range of error
    BOOL          fRangeValid;    //TRUE if valid iptRange
    PSZ           pszMsgID;       //Message ID
    CHAR          Severity;       //Severity of message
    PSZ           pszMessage;     //Text of message
    PSZ           pszTag;         //Used to differentiate
                                  //messages in same file
} XEIR;
typedef struct _xeir   *PXEIR;    //Pointer to XEIR
```

File Location Information Record (FLIR)

The FLIR is used when deleting a group of messages from the Error List. It points to the ECB of the file being edited; processors which create an Events File should set this to NULL. It also specifies an IPT range to process errors in; set both IPTs to zero if the whole file should be processed. Processors which create an Events File should set both IPTs to zero.

```
FLIR
typedef struct _flir {
    PECB         pECB;         //Pointer to file's ECB
    IPTRANGE     iptRange;     //Range to process
    PSZ          pszTag;       //Used to differentiate
                               //messages in same file
} FLIR;
typedef struct _flir   *PFLIR;     //Pointer to FLIR
```

The Events File

The Events File is produced sequentially. Each processor is simply appending new records to it. When an important event occurs, a record is written to the Events File. Thus every compilation process will produce an Events File.

On each platform, the external characteristics of the Events File (for example, record format, logical record length, access method, etc. on MVS) produced by the various processors should be the same. This is not required across platforms. Each record will be typed according to its contents. This allows future extensions by creating new records allowable in the Events File.

The definitions below may not work for mechanisms like the COBOL BASIS/INSERT/DELETE statements, which are, in essence, a language-specific update facility.

The following record types are defined:

Timestamp record—Indicates when the Events File creation started.

Processor record—Indicates a new processor has been invoked.

File ID record—Indicates an input file has been opened.

File end record—Indicates an input file has been closed.

Error information record—Indicates that an error has been detected in the input source code.

Program record—Indicates beginning of a second program source within the source code file being processed.

Map define record—Indicates a macro definition within the input source code.

Map start record—Indicates beginning of generated source code.

Map end record—Indicates end of generated source code.

Since different types of records will be included in this one file, the first word in each record will identify the record type. The formats of these record types are described below. In the syntax diagrams, each token should be separated by exactly one blank.

Timestamp Record

This record indicates when the Events File was created, and allows an application to determine if the Events File is current (if the timestamp is older than a file indicated in a File ID record, the Events File may be incorrect for that file). This record is always the first record in the Events File. It is not required that this record be written by a processor; it may be written by the caller of the first processor. This allows each processor to append to the Events File without having to determine if the file exists.

The timestamp record is described as follows:

| | TIMESTAMP -- version -- timestamp |
|---|---|
| Where | Represents |
| version | The revision of this record, used for upward compatibility. |
| timestamp | The date and time the Events File was created in yyyymmddhhmmss format. |

Processor Record

This record indicates that a new processor has been invoked. One will always follow the timestamp record in the Events File (although there may be more than one).

The processor record is described as follows:

| | PROCESSOR -- version -- output-id -- line-class |
|---|---|
| Where | Represents |
| version | The revision of this record, used for upward compatibility. |
| output-id | The file ID of an output file produced by this processor. If the output of this processor is intended to be used as input to another processor, this file ID represents that file, and the file ID record of the file will follow this record. If this is the last processor that will be invoked for which the IDE will be expected to display messages, the file ID is 0. |
| line-class | Method used to number lines. Specify zero if a temporary file or internal file containing an expanded source representation is being used; the line number represents the line number in the expanded source. Specify one if the line number represents the physical line number in the source file indicated in source file ID field. |

File ID Record

This record contains the full name of the source file processed and associates an integer with the file name. There should be one record of this type for each source file processed by the compiler, the main source file as well as any included source units (copylib members) and macros. Because the location where a file is included is important, if a file is included several times during processing, a file id record should be written for each inclusion. A processor should not keep track of files it has already included and only write a file id record if a file record had not been written for this file.

The file ID record is described as follows:

| | FILEID -- version -- source-id -- line -- length -- filename |
|---|---|
| Where | Represents |
| version | The revision of this record, used for upward compatibility. |
| source-id | A file identifier expressed as an integer to be used in place of the file name to correlate an error record with the source file in which it occurred, without having to use the character based file name. Use zero if the input file is not known, such as input coming from a user exit. |
| line | Source file line number where a new file is referenced, or zero if the file was not referenced from a file. |
| length | Length of the file name |

-continued

| filename | The name should be the fully-qualified physical file name. If none exists (for example, getting text from the user) or the name can't be determined, place a null string here. |
|---|---|

File End Record

This record indicates that an included file is ending. It provides a method for viewing a file which includes a file containing an error. This is useful when the included file does not contain enough information to determine what caused the error.

The file end record is described as follows:

| | FILEEND -- version -- file-id -- expansion |
|---|---|
| Where | Represents |
| version | The revision of this record, used for upward compatibility. |
| file-id | The file ID of this file. |
| expansion | Number of expanded source lines in this file, including any nested includes and macro expansions. |

Error Information Record

A record of this type contains information required to highlight a token or line causing a message in the source file, as well as enough information to allow the message itself to be displayed. This information includes location information (such as what file and line the error occurred on) and information related to the error itself (such as the number, text, and severity of the message).

The error information record is described as follows:

| ERROR -- version -- file-id -- annot-class -- stmt-line -- start-err-line -- token-start -- end-err-line -- token-end -- msg-id -- sev-char -- sev-num -- length -- msg | |
|---|---|
| Where | Represents |
| version | The revision of this record, used for upward compatibility |
| file-id | The file ID number of the source file containing this error. |
| annot-class | Indicates where in a listing of messages this message should be placed. The following positions are defined: |
| | Class Meaning |
| | 0 Top of list. Generally used for very important messages that aren't really associated with a specific line in a file (for example, compiler ran out of storage). The sorting order for multiple instances of messages of this type is not defined. Because no text generally corresponds to this error, no highlighting will be done in the edit window. |
| | 1 Middle of list. Generally used for messages which are associated with a single line or token (for example, an undeclared identifier). Multiple messages of this type are sorted by line number. |
| | 2 Bottom of list. Generally used for less important messages that aren't really associated with a specific line in a file (for example, compiler option invalid). The sorting order for multiple instances of messages of this type is not defined. Because no text generally corresponds to this error, no highlighting will be done in the edit window. |

-continued

| stmt-line | Line number (in the source file associated with the above source file ID number) of the first line of the statement containing the error. This is required in case the error does not occur on the first line of the statement. This number is interpreted using the line class field of the Processor Record. |
|---|---|
| start-err-line | Line number (in the source file associated with the above source file ID number) containing the start of the error. This number is interpreted using the line class field of the Processor Record. |
| token-start | Column (or character in the line) of the start of the token in error. If this information is not available, a zero here will cause the first column (or character) to be used as the start of the error. |
| end-err-line | Line number (in the source file associated with the above source file ID number) containing the end of the error. This number is interpreted using the line class field of the Processor Record. |
| token-end | Column (or character in the line) of the end of the token in error. If this information is not available, a zero here will cause the last column (or character) to be used as the end of the error. |
| msg-id | Message ID, left justified. For example, AMPX999 |
| sev-char | Severity code letter (I, W, E, S, or T). |
| sev-num | Severity level number. For some systems, this is the return code associated with the severity code letter (I=0, W=4, E=8, S=12, T=16). |
| length | The actual length of the next field (message text). |
| msg | The message text of the error message. Any replacement of fields should have already been done. |

Program Record

This record indicates a new program in the same source file is being compiled. It is used when multiple programs are contained in one file. Expanded source line is assumed to start over at 1 when this record is written. It is not needed to indicate the first program in the file.

The program record is described as follows:

| | PROGRAM -- version -- line |
|---|---|
| Where | Represents |
| version | The revision of this record, used for upward compatibility. |
| line | The position in the file that this program starts. |

Map Define Program Record

This record indicates that a macro is being defined. It is used to allow errors to be reflected back to a macro definition instead of the place the macro is used.

The map define record is described as follows:

| | MAPDEFINE -- version -- macro-id -- line -- length -- macro-name |
|---|---|
| Where | Represents |
| version | The revision of this record, used for upward compatibility. |
| macro-id | Integer representing this macro definition. It should be incremented sequentially within a specific file. |
| line | Physical line in the current file where the macro definition starts. |
| length | Length of the macro name. |
| macro-name | The name of the macro being defined. |

Map Start Record

This record indicates that source expansion is starting. It is used where any textual replacement is being done (for example, a macro).

The map start record is described as follows:

|  | MAPSTART -- version -- macro-id -- line |
|---|---|
| Where | Represents |
| version | The revision of this record, used for upward compatibility. |
| macro-id | Identifier of a macro specified in a map definition record. |
| line | Physical line in the current file where expansion starts. |

Map End Record

This record indicates that source expansion is complete. It is used at the end of a textual replacement to show how many lines were created.

The map start record is described as follows:

|  | MAPEND -- version -- macro-id -- line -- expansion |
|---|---|
| Where | Represents |
| version | The revision of this record, used for upward compatibility. |
| macro-id | Identifier of a macro specified in a map definition record. |
| line | Physical line in the current file where expansion ends. |
| expansion | Number of lines resulting from this macro expansion, including any nested expansions. |

Using the foregoing specifications the invention may be implemented using standard programming and/or engineering techniques. The resulting program(s) may be stored on disk, diskettes, memory cards, ROM or any other memory device. For execution, the program may be copied into the RAM of the computer. User input may be received from keyboard, mouse, pen, voice, touch screen or any other means by which a human can input data to a computer. One skilled in the art of computer science will easily be able to combine the software created as described with appropriate general purpose or special purpose computer hardware to create a computer system embodying the invention. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A method for using a computer system to display error messages, the error messages being associated with a user's source code, the computer system being communicatively connected to a remote computer and said computer system having a processor, a memory and means for receiving user input, comprising the steps of:

transmitting the source code to the remote computer for processing;

receiving remote error identification data from the remote computer identifying one or more errors detected in the source code and for each error designating an error type and specifying a location of the error in the source code;

storing data in an error list in the computer system memory indicative of each error in the remote error identification data;

displaying data in human readable form indicative of a selected error, received from said means for receiving user input, from the error list and dynamically locating, in response to said selected error, a portion of the source code containing the error, and displaying, concurrently with but separately from said displayed data, said portion of the source code;

modifying the displayed portion of the source code containing the error responsive to said means for receiving user input;

altering the error list in the memory responsive to the step of modifying the displayed portion of the source code; and repeating the modifying and altering steps until input, received from said means for receiving user input, indicative of a command to halt is received.

2. The method of claim 1 further comprising the steps of:

executing a parser, compiler or translator on a unit of source code using the processor;

receiving local error identification data from the parser, compiler or translator identifying one or more errors detected in the source code and for each error designating an error type and specifying a location of the error in the source code;

storing data in the error list in the memory indicative of each error in the local error identification data.

3. The method of claim 1 wherein the step of receiving remote error identification data further comprises the step of receiving data identifying the file in which each error occurred, if said user's source code comprises a plurality of files.

4. The method of claim 2 wherein the step of receiving local error identification data further comprises the step of receiving data identifying the file in which each error occurred, if said user's source code comprises a plurality of files.

5. The method of claim 4 further comprising the step of displaying an identifier for each file in the error list along with each error message associated with each file.

6. The method of claim 5, wherein the system has an editor into which files can be loaded, further comprising the steps of:

selecting responsive to user input an error from the error list; and loading into the editor the file in which the error occurred.

7. A method for using a computer system to display error messages associated with a user's source code, the system having a processor, a memory, means for receiving user input and a source code editor, comprising the steps of:

storing an error message data entry in an error list in the memory of the computer designating an error type and specifying a location of the error in the source code, the error being detected when an unit of source code has been processed responsive to said means for receiving user input;

displaying data, in human understandable form, indicative of at least one selected error message data entry from the error list and dynamically locating, in response to said selected error message, a portion of the source code containing the error, and displaying, concurrently with but separately from said displayed data, said portion of source code;

altering the error list to indicate when the location in the source code has been modified or deleted by a source code editor responsive to said means for receiving user input; and repeating the displaying and altering steps until input, received from said means for receiving user input, indicative of a command to halt is received.

8. The method of claim 7 wherein the step of storing an error message data entry further comprises the step of storing data identifying the file in which each error occurred, if the user's source code includes a plurality of files.

9. The method of claim 8 further comprising the step of displaying an identifier for each file in the error list along with each error message associated with each file.

10. The method of claim 9 further comprising the steps of:
selecting responsive to user input an error from the error list; and
loading into an editor the file in which the error occurred.

11. The method of claim 10, wherein the system is connected to a remote computer, further comprising the steps of:
transmitting a unit of source code to the remote computer for processing;
receiving from the remote computer error data for one or more errors designating an error type, specifying the file name and a location of each error in the source code file; and
storing an error message data entry in the error list in the memory of the computer indicative of the remote computer error data.

12. A system for displaying error messages associated with a user's source code, the system having a processor, a memory, means for receiving user input and means for editing the source code, said system comprising:
means for storing one or more error message data entries in an error list in the memory of the computer designating an error type and specifying a location of the error in the source code, the error being detected when an unit of source code has been processed responsive to user input;
means, connected to the editing means, for displaying data, in human understandable form, indicative of the error message data entry from the error list, and displaying, concurrently with but separately from said displayed data, a portion of the source code containing the error;
means, connected to the editing means, for dynamically altering the error list to indicate when the location in the source code containing the error has been modified or deleted responsive to user input; and
means for repeatedly activating the displaying and altering means responsive to user input until user input indicative of a command to halt is received.

13. The system of claim 12 wherein the user's source code includes a plurality of files, the means for storing one or more error message data entries further comprising means for storing data identifying the file in which each error occurred.

14. The system of claim 13 further comprising means for displaying an identifier for each file in the error list along with each error message associated with each file.

15. The system of claim 14 further comprising:
means, responsive to user input, for selecting an error from the error list; and
means for loading into an editor the file in which the error occurred.

16. The system of claim 15, wherein the system is connected to a remote computer, further comprising:
means for transmitting a unit of source code to the remote computer for processing;
means for receiving from the remote computer error data for one or more errors designating an error type, the file name and the location of each error in the source code file; and
means for storing an error message data entry in the error list indicative of the remote computer error data.

17. A method for using a computer system to display at least one error message, said computer system having a processor, a memory, a display, and means for receiving user input, said method comprising:
displaying, in one portion of the display, an error list having a capability to contain every one of said at least one error message generated by at least one processing program which processes at least one source file;
dynamically displaying, simultaneously with displaying said error list, in a different portion of the display, a source file portion, of the at least one source file, containing an error causing one of said at least one error message, when said one of said at least one error message is selected in response to an indication from said means for receiving user input, wherein said at least one source file is unaltered by said at least one error message; and
in response to a modification of said at least one source file, dynamically changing said error list to reflect said modification.

18. A method for using a computer system to display at least one error message, said computer system having a processor, a memory, a display, and means for receiving user input, said method comprising:
displaying, in one portion of the display, an error list having a capability to contain every one of said at least one error message generated by at least one processing program which processes at least one source file;
dynamically displaying, simultaneously with displaying said error list, in a different portion of the display, a source file portion, of the at least one source file, containing an error causing one of said at least one error message, when said one of said at least one error message is selected in response to an indication from said means for receiving user input, wherein said at least one source file is unaltered by said at least one error message; and
in response to a modification of said at least one source file, dynamically changing said error list to reflect said modification.

19. The method of claim 18 wherein said one portion of the display displaying the error list is a read-only window.

20. The method of claim 18 wherein the at least one source file comprises source code.

21. The method of claim 20 wherein the error list is language independent whereby said error list comprises a plurality of said at least one error message representing a plurality of errors from a plurality of languages.

22. The method of claim 18 wherein the at least one source file comprises text.

23. The method of claim 19 wherein said read-only window pops up and displays said error list, independently of said means for receiving user input, if said error is detected after a parse, during a compilation, or when said source file is opened.

24. The method of claim wherein said error list dynamically changes when a live parser is invoked; syntax checking is performed on at least said source file portion of said source file; said source file is compiled; a text range, in said source file, containing said error, is deleted; and a text range, in said source file, containing said error, is changed.

25. The method of claim 20 wherein said at least one processing program is a parser and a compiler.

26. The method of claim 25 wherein said compiler is remote from said computer system. source file has been modified in an attempt to correct a cause of said compiler message.

27. The method of claim 18 wherein the source file is a plurality of files.

28. The method of claim 18 further comprising automatically loading said source file into an editor in said computer system simultaneously with said step of displaying said source file portion of the at least one source file when said one of said at least one error message is selected.

29. The method of claim 18 wherein a subportion, of said source file portion, of the at least one source file, causing said one of said at least one error message, is highlighted.

30. The method of claim 18 further comprising immediately adding a resulting error message to the error list and highlighting a subportion, of said portion of the at least one source file, causing the resulting error message, if a new error is created during said modification of said at least one source file.

31. The method of claim 18 wherein said dynamically changing said error list comprises automatically removing a parser message from said error list when a parse is done on a modified portion, which corrects a cause of said parser message, of said source file, and automatically adding an indication to a compiler message, maintained in said error list prior to a recompilation, indicating that a corresponding portion of said source file has been modified in an attempt to correct a cause of said compiler message.

32. The method of claim 31 wherein said dynamically changing said error list comprises removing said compiler message when said source file is recompiled and said modification corrects the cause of said compiler message.

33. The method of claim 18 further comprising immediately adding another error message to said error list when a new error is created and detected during said modification of said at least one source file, and immediately highlighting a subportion of said source file causing said another error message.

34. The method of claim 18 wherein said error list displayed contains a file name of each of said at least one source file and all of said at least one message of said source file when said at least one source file is expanded, and contains only said file name of each of said at least one source file when said source file is contracted.

35. The method of claim 34 further comprising automatically expanding one of said contracted source files when a new error message is added to the error list for said contracted source file and automatically expanding all of said source files when said error list is first displayed.

36. A system for displaying at least one error message, said system having a processor, a memory, a display, and means for receiving user input, said system comprising:

means for displaying, in one portion of the display, an error list having a capability to contain every one of said at least one error message generated by at least one processing program which processes at least one source file;

means for dynamically displaying, simultaneously with displaying said error list, in a different portion of the display, a source file portion of the at least one source file, containing an error causing one of said at least one error message, when said one of said at least one error message is selected in response to an indication from said means for receiving user input, wherein said at least one source file is unaltered by said at least one error message; and in response to a modification of said at least one source file, means for dynamically changing said error list to reflect said modification.

* * * * *

UNITED STATES PATENT AND TRADEMARK OFFICE
CERTIFICATE OF CORRECTION

PATENT NO. : 6,115,544
DATED : September 5, 2000
INVENTOR(S) : Steven Holt Mueller It is certified that error appears in the above-identified patent and that said Letters Patent is hereby corrected as shown below:

Claims,

Column 18,
Line 58, after "claim" and before "wherein", please insert -- 18 --;
Lines 67, 68, and 69, after "system.", please delete "source file has been modified in an attempt to correct a cause of said compiler message."

Signed and Sealed this

Nineteenth Day of February, 2002

Attest:

Attesting Officer

JAMES E. ROGAN
Director of the United States Patent and Trademark Office